United States Patent [19]
Abe et al.

[11] Patent Number: 5,901,160
[45] Date of Patent: May 4, 1999

[54] DECODER WITH AN ERROR CONTROL ADAPTIVELY APPLIED ON THE BASIS OF THE ESTIMATED POSITION OF A SLOT IN A FRAME

[75] Inventors: Masami Abe; Jun Iwata, both of Tokyo, Japan

[73] Assignee: Oki Electric Industry Co., Ltd., Tokyo, Japan

[21] Appl. No.: 08/806,615

[22] Filed: Feb. 26, 1997

[30] Foreign Application Priority Data

Feb. 27, 1996 [JP] Japan ................................. 8-039280

[51] Int. Cl.⁶ ............................................. H03M 13/00
[52] U.S. Cl. ......................... 371/41; 370/465; 348/415; 371/42
[58] Field of Search ............................ 371/5.1, 5.4, 30, 371/31, 41, 42, 43.1, 46; 348/409, 415; 370/464, 465

[56] References Cited

U.S. PATENT DOCUMENTS

| | | | |
|---|---|---|---|
| 3,700,820 | 10/1972 | Blasbalg et al. . | |
| 4,562,466 | 12/1985 | Clapp et al. . | |
| 5,432,800 | 7/1995 | Kuroda et al. ......................... | 371/37.1 |
| 5,450,398 | 9/1995 | Abefelt et al. . | |
| 5,657,342 | 8/1997 | Olmstead ................................ | 375/200 |
| 5,673,266 | 9/1997 | Li ........................................... | 370/465 |
| 5,684,806 | 11/1997 | Akiyama ................................. | 370/522 |
| 5,734,678 | 3/1998 | Paneth et al. ........................... | 375/240 |
| 5,768,276 | 6/1998 | Diachina et al. ....................... | 370/432 |

FOREIGN PATENT DOCUMENTS

| | | | |
|---|---|---|---|
| 2-108332 | 4/1990 | Japan ................................. | H04B 7/26 |
| 7-177136 | 7/1995 | Japan ................................. | H04L 7/08 |
| 7-240740 | 9/1995 | Japan ................................. | H04B 7/26 |

*Primary Examiner*—Albert DeCady
*Attorney, Agent, or Firm*—Rabin & Champagne, P.C.

[57] ABSTRACT

A decoder which is adapted to receive a frame of coded data consisting of multiple slots including intra-frame position information indicating positions of the slots in the frame to decode the coded data, and which adaptively applies appropriate ones of plural error control methods depending on the position of the slots in the frame. An estimated value of the intra-frame position information of a current slot and a fixed amount of variation per slot of the intra-frame position information are generated in accordance with an estimated value of the intra-frame position information of an immediately preceding slot. Synchronization is established between a received value and the estimated value of the intra-frame position information. An error control method to be applied to the current slot in the synchronous state of the received value and the estimated value is determined in response to the estimated value of the intra-frame position information of the current slot generated. The decoder can achieve error control of received data correctly even if an error occurs with the received value of the intra-frame position information.

6 Claims, 13 Drawing Sheets

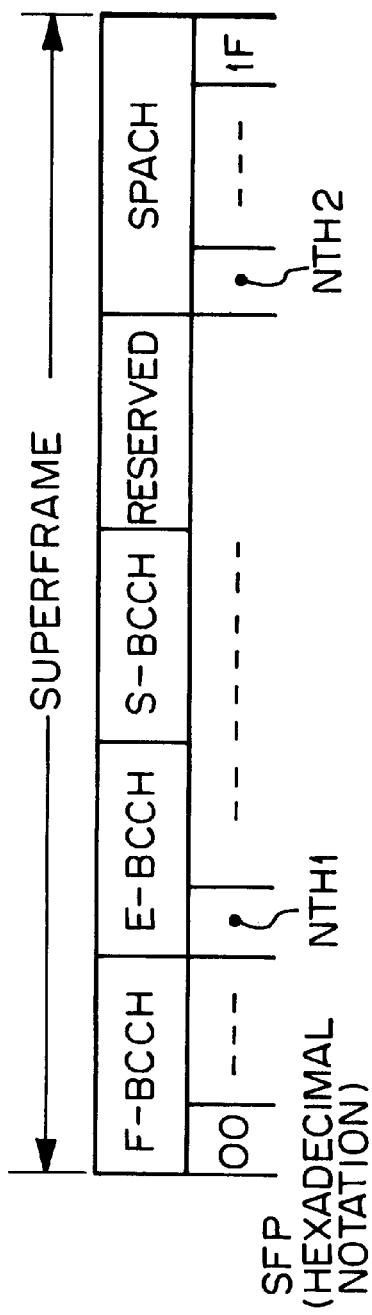
Fig. 2
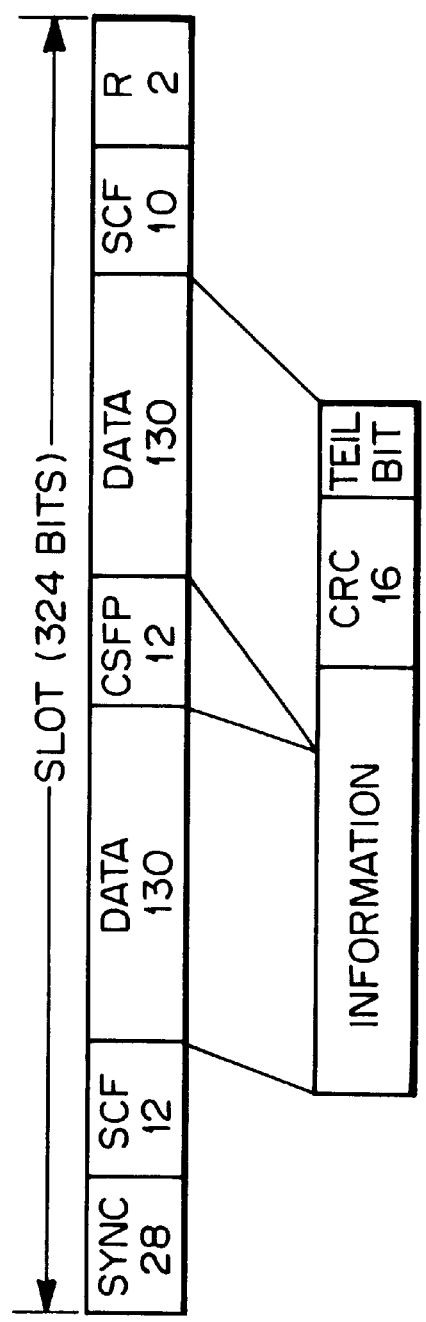
Fig. 3A
Fig. 3B

Fig. 4

| CHANNEL TYPE | F-BCCH | E-BCCH | S-BCCH | RESERVED | SPACH |
|---|---|---|---|---|---|
| DVCC | 0 | \multicolumn{3}{c}{VALUE DESIGNATED BY BASE STATION} | |
| INVERTED OR NONINVERTED | | INVERTED | | | NONINVERTED |
| CALCULATION MODE | A | B | | | C |

DECODER WITH AN ERROR CONTROL ADAPTIVELY APPLIED ON THE BASIS OF THE ESTIMATED POSITION OF A SLOT IN A FRAME

BACKGROUND OF THE INVENTION

1. Field of the Invention

The present invention relates to a decoder for decoding coded data, which is preferably applied to a digital control channel receiver of a TDMA cellular system in accordance with the North American Standard of TDMA (Time Division Multiple Access), such as TIA (Telecommunications Industry Association)-TDMA (IS-136).

2. Description of the Background Art

The digital channels of the TDMA cellular system in accordance with the North American Standard include digital control channels (DCCHs hereinbelow) for conveying information required for call control from a base station to mobile stations, and digital traffic channels (abbreviated DTCs hereinbelow) for conveying user's information.

The down link communications from the base station to the mobile stations using the DCCHs is carried out on a superframe basis. The superframe consists of 32 time slots in full-rate transmission, and 16 time slots in half-rate transmission. Information describing the position of a slot in the superframe is called a superframe phase (abbreviated SFP hereinbelow). The SFP consists of an 8-bit code of modulo 32 (although a 5-bit code is enough, the 8-bit code is used for the purpose of simplifying a processing circuit). In the half-rate superframe, only odd- or even-numbered slots are used.

As shown in FIG. 2, the superframe consists of a fast broadcast channel (abbreviated F-BCCH hereinbelow), an extended broadcast channel (abbreviated E-BCCH hereinbelow), a short message service broadcast channel (abbreviated to S-BCCH hereinbelow), reserved slots and Smsch, Pch and Arch channels (abbreviated SPACHs hereinbelow).

The F-BCCH is a channel used for transmitting known information such as structure variables of the DCCHs, parameters needed for access to a system, or the like. Parameters NTH1, NTH2, and DVCC which will be described later are transmitted from the base station to the mobile stations over the F-BCCH. The E-BCCH is used for transmitting information less critical in time than that transmitted over the F-BCCH. The S-BCCH is used for short message broadcast services The SPACHs are used for calling or transmitting orders (PCH), responding to the access from the mobile stations (ARCH), and point-to-point short message services (SMSCH).

Although the number of slots of the F-BCCH, E-BCCH, S-BCCH and SPACHs differ from superframe to superframe of respective frequencies depending on the purpose (chiefly, whether they are used for message services or waiting), the SFPs are assigned in any superframes in such a fashion that they change in ascending order from 00h (h is a hexadecimal notation) to 1Fh in the order of F-BCCH, E-BCCH, S-BCCH, reserved slots, and SPACHs, as shown in FIG. 2.

The SFP of the initial slot of the E-BCCH (called NTH1 hereinbelow), and the SFP of the initial slot of the SPACHs (called NTH2 hereinbelow) are obtained by decoding the F-BCCH followed by analyzing the obtained data.

As shown in FIG. 3A, each slot (consisting of 324 bits) in the superframe consists of a 28-bit synchronizing signal (SYNC), a 12-bit random access control signal (shared control feedback: SCF), 130-bit data (DATA), a 12-bit coded SFP (called CSFP below), 130-bit data (DATA), a 10-bit random access control signal (SCF), and two reserved bits (R).

As mentioned above, the 8-bit SFP is coded into a 12-bit CSFP. More specifically, the SFP is coded into a (12, 8) Hamming code, and the resultant 4-bit parity bits are inverted and added to the SFP to form the CSFP. Accordingly, the mobile station can find the location of the current slot in the superframe by obtaining the SFP by decoding the CSFP.

As shown in FIG. 3B, the data section (DATA) consists of information which is the body of the transmitted data, a CRC which consists of check bits for error detection or error correction of the information, and a tail bit representing the end of the data section.

The methods of calculating the CRC of the data sections at a receiver (mobile station) can be classified into three types A, B and C, depending on the types of channels to which the slot belongs. More specifically, the calculating methods of the CRC are classified into three types A, B and C as shown in FIG. 4, depending on the value of a check code (abbreviated to DVCC hereinbelow) and whether or not the parity bits are inverted when used. The DVCC determines the generator polynomial used for calculating the CRC, and varies depending on the frequency of the superframe. The calculating method A is used for the slots belonging to the F-BCCH, in which the DVCC with a value zero is used, and the parity bits are inverted. The calculating method B is used for the slots belonging to the E-BCCH, S-BCCH and reserved slots, in which the DVCC with a value designated by the base station (BS) is used, and the parity bits are inverted. The method C is used for the slots belonging to the SPACHs, in which the DVCC with a value designated by the base station is used, and the parity bits are not inverted.

The slots of the F-BCCH use the DVCC with a value zero because the value of the DVCC can be obtained for the first time after analyzing the F-BCCH data as in the case of the above-mentioned NTH1 and NTH2.

Thus, any of the methods of calculating the CRC of the received data is used depending upon the channels to which the slots belong. Therefore, the types of the channels (classified in terms of the methods of calculating the CRC) to which the slot belongs must be recognized before performing decoding, detection and correction of the received data in the slot. Here, the types of methods of calculating the CRC are conventionally recognized by obtaining the SFP of the slot by decoding the CSFP, and by comparing the obtained SFP with the parameters NTH1 and NTH2.

There is the possibility in the conventional method, however, that the type of the channel to which the slot belongs cannot be identified, and this will degrade the accuracy of decoding the data. The reason for this is as follows. As described above, the CSFP employs a Hamming code. On the other hand, the data section (DATA) uses convolutional codes. According to the Recommendations to the digital channels of the TDMA systems based on the North American Standard, the free space distance of the convolutional codes is greater than that of the Hamming code, which means that the error correction performance of the convolutional codes is greater than that of the Hamming codes. Thus, there is the possibility that the CSFPs consisting of Hamming codes cannot be correctly decoded, which will lead to errors in decoding, error detection and correction of the received data (DATA). This will cause degradation in the accuracy of decoding the data.

That problem arises not only with the digital control channels of the TDMA cellular system according to the North American Standard, but also with other digital communication systems which switch the error control methods depending on the slot location in the frame.

SUMMARY OF THE INVENTION

It is therefore an object of the present invention to provide a decoder which can achieve correct error checking of the received data even if the SFP (intra-frame position information) includes an error.

According to an aspect of the present invention, there is provided a decoder for receivng a frame of coded data consisting of multiple slots which include intra-frame position information indicating the positions of the slots in the frame and decoding the coded data, wherein an appropriate one of plural error control methods is adaptively applied depending on the position of the slots in the frame. The decoder includes: intra-frame position estimation means for generating an estimated value of the intra-frame position information of a current slot in accordance with an estimated value of the intra-frame position information of an immediately preceding slot, and a fixed amount of variation per slot of the intra-frame position information; intra-frame position information synchronization means for establishing synchronization between a received value and the estimated value of the intra-frame position information; and applied method determination means for determining an error control method to be applied to the present slot in a synchronous state of the received value and the estimated value, in response to the estimated value of the intra-frame position information of the current slot generated by the intra-frame position estimation means.

According to another aspect of the present invention, there is provided a decoder for receiving a frame of coded data consisting of multiple slots, wherein an appropriate one of plural error control methods is adaptively applied, depending on the position of the slots in the frame. The decoder includes a plurality of error control means, each corresponding to one of the error control methods, for performing an error control operation an received data in a present slot by applying each of the error control methods to the current slot regardless of the positions of the slots in the frame; and application method selection means for selecting a control result obtained by one of the plurality of error control means as a control result obtained by a control method assigned to the current slot, considering control results obtained by the plurality of error control means.

According to the first above-described aspect of the present invention, in the synchronous state in which the received value of the intra-frame position information is synchronized with the estimated value, the decoder generates the estimated value of the intra-frame position information of the present slot, and determines the error control method to be applied to the present slot on the basis of the estimated value of the generated intra-frame position information. This makes it possible to achieve the error control operation for the received data correctly, even if an error occurs in the received value of the intra-frame position information in the synchronous state.

According to the second above-described aspect of the present invention, the decoder applies all types of error control methods to the received data of the current slot regardless of the error control methods determined depending on the location of the current slot in the frame, and then selects the error control method to be applied to the current slot based on these error control results. This makes it possible to obtain the result that would be obtained when the correct error control operation is performed on the received data.

BRIEF DESCRIPTION OF THE DRAWINGS

The objects and features of the present invention will become more apparent from consideration of the following detailed description taken in conjunction with the accompanying drawings in which:

FIG. 2 is a diagram showing an example of the channel structure of the superframe on a digital control channel;

FIGS. 3A and 3B show a diagram showing an example of the data structure of a slot;

FIG. 4 is a diagram showing the relationships between channel types and CRC computing methods;

DESCRIPTION OF THE PREFERRED EMBODIMENTS

The invention will now be described with reference to the accompanying drawings. The following embodiments relate to the digital control channels of the TDMA cellular system based on the North American Standard.

EMBODIMENT 1

Figure 5:
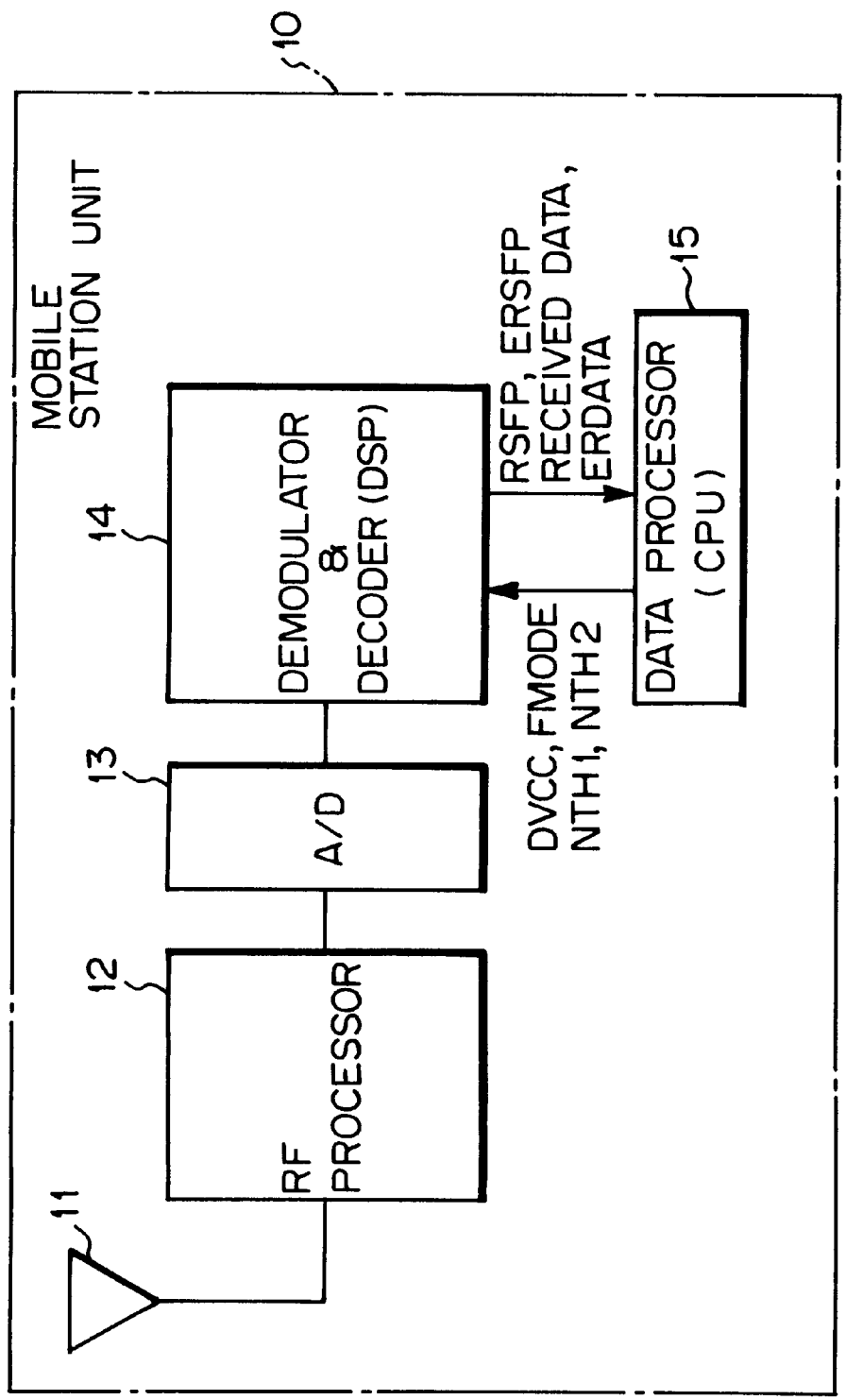
FIG. 5 is a schematic block diagram showing the first embodiment of the decoder in accordance with the present invention.

Referring first to FIG. 5, schematically showing a mobile station unit of an embodiment of the present invention, the mobile station unit 10 generally comprises an antenna 11, an RF (Radio Frequency) processor 12, an analog-to-digital (A/D) converter 13, a demodulator/decoder 14, and a data processor 15.

A signal captured by the antenna 11 is fed to the RF processor 12. The RF processor 12 tunes its frequency to a desired channel to be received, and carries out the AGC control. The received signal of the desired channel is fed to the A/D converter 13 which converts it to a digital signal. The demodulator and decoder 14, which is composed of a digital signal processor (DSP), for example, transforms the input digital signal- into a sequence of codes by performing digital decoding, and provides the data processor 15 with received data (corresponding to the above-mentioned information) obtained by decoding the code sequence, together with a flag ERDATA representing whether the received data includes an error (binary "1") or not (binary "0"), received SFP (called RSFP hereinbelow), and a flag ERSFP representing whether the RSFP includes an error ("1") or not ("0"). The data processor 15 is composed of a central processing unit (CPU) that is adapted to process the received data or others supplied from the demodulator and decoder 14. The data processor 15 in cthe instant embodiment reversely provides the demodulator and decoder 14 with the parameters DVCC, NTH1 and NTH2, which are obtained as a result of analyzing the received data of the F-BCCH, together with a flag FMODE representing whether a receiving mode is a continuous receiving mode or an intermittent receiving mode.

The continuous receiving mode and the intermittent receiving mode are defined as follows: The general sequence from turning on the power supply (initial state) to entering the waiting state for being called in the mobile station includes the following three stages. (1) The mobile station, receiving the F-BCCH, analyzes the known information included in the F-BCCH to obtain information on the structure of the superframe including the DVCC, NTH1 and NTH2. (2) The mobile station analyzes the data in the E-BCCH and S-BCCH as needed. (3) The mobile station repeats receiving the PCH in the SPACHs designated by the base station, thus waiting for a call. Generally, the reception of the PCH is carried out independently, without accompanying the reception of the other channels, to save power consumption.

Thus, at the sequences (1) and (2), it is necessary to continually perform receiving processing of the time slots of multiple channels. This type of receiving mode is called the continuous receiving mode. On the contrary, at the sequence (3), it is necessary to perform receiving processing of only the slot of the designated PCH. This type of receiving mode is called the intermittent receiving mode. The receiving processing of the SPACHs can also be carried out in the continuous receiving mode. The data processor 15 generates the flag FMODE representing whether the receiving mode is the continuous receiving mode or intermittent receiving mode in accordance with the sequence step at that time, and provides it to the demodulator and decoder 14.

Next, the featured processing of the embodiment carried out by the demodulator and decoder 14 will be described in its entirety with reference to FIG. 1. In the following description, the demodulator and decoder 14 and data processor 15 are abbreviated DSP 14 and CPU 15, respectively.

Figure 1:
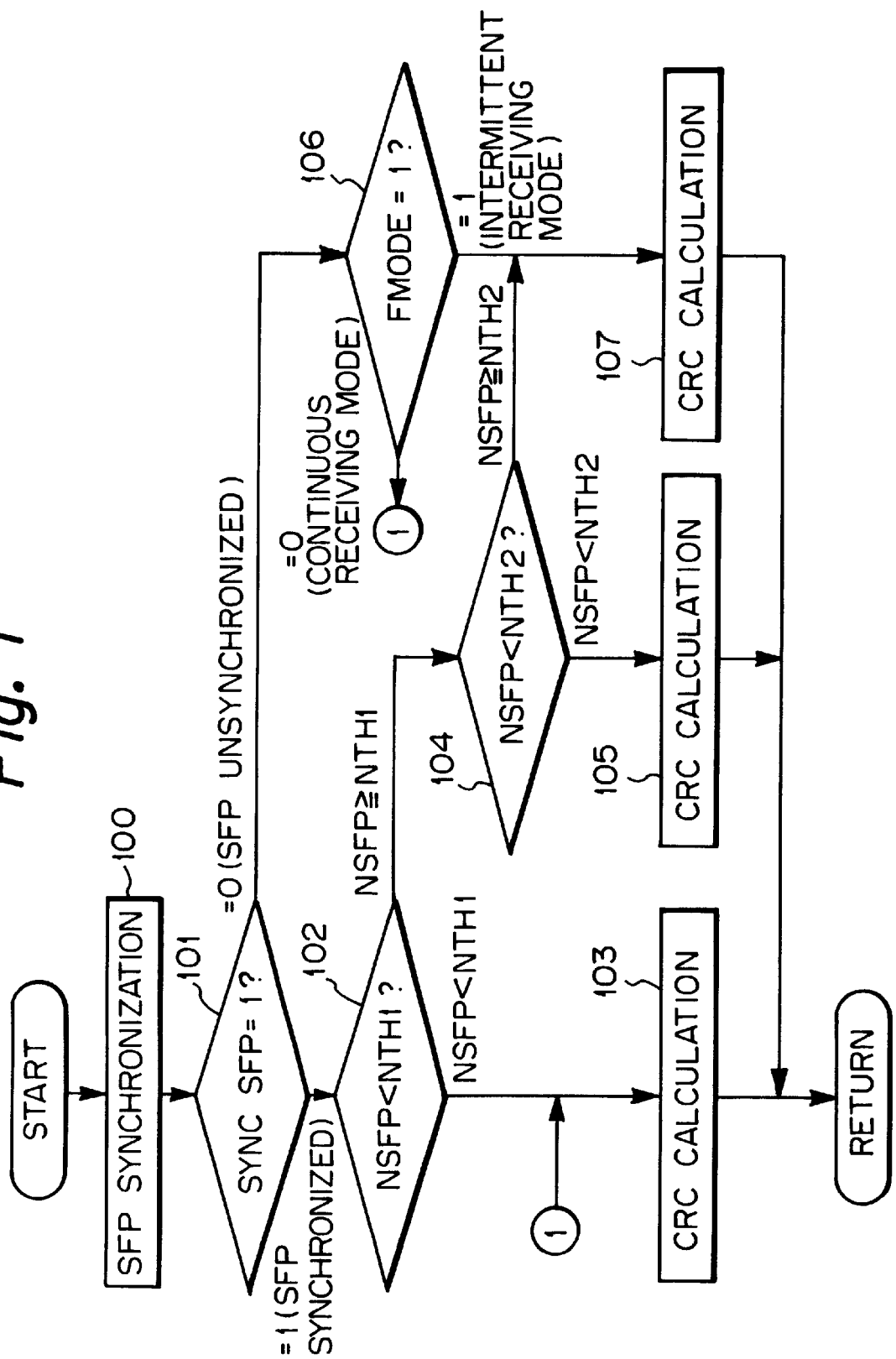
FIG. 1 is a flowchart showing the overall processing in a first embodiment of a decoder in accordance with the present invention.
Figure 6A:
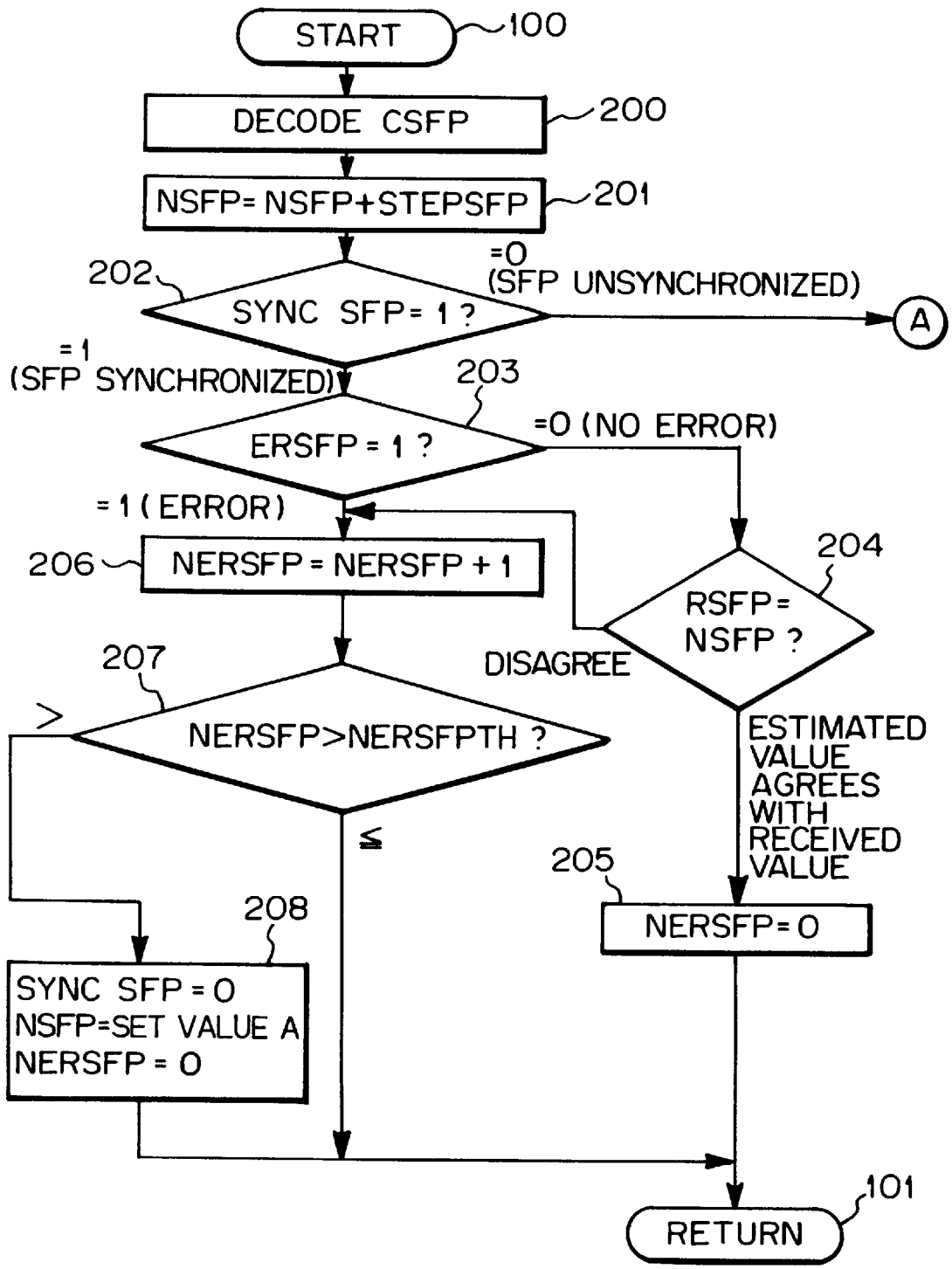
FIGS. 6A and 6B are a specific flowchart useful for understanding the SFP synchronizing processing in the first embodiment; .
Figure 6B:
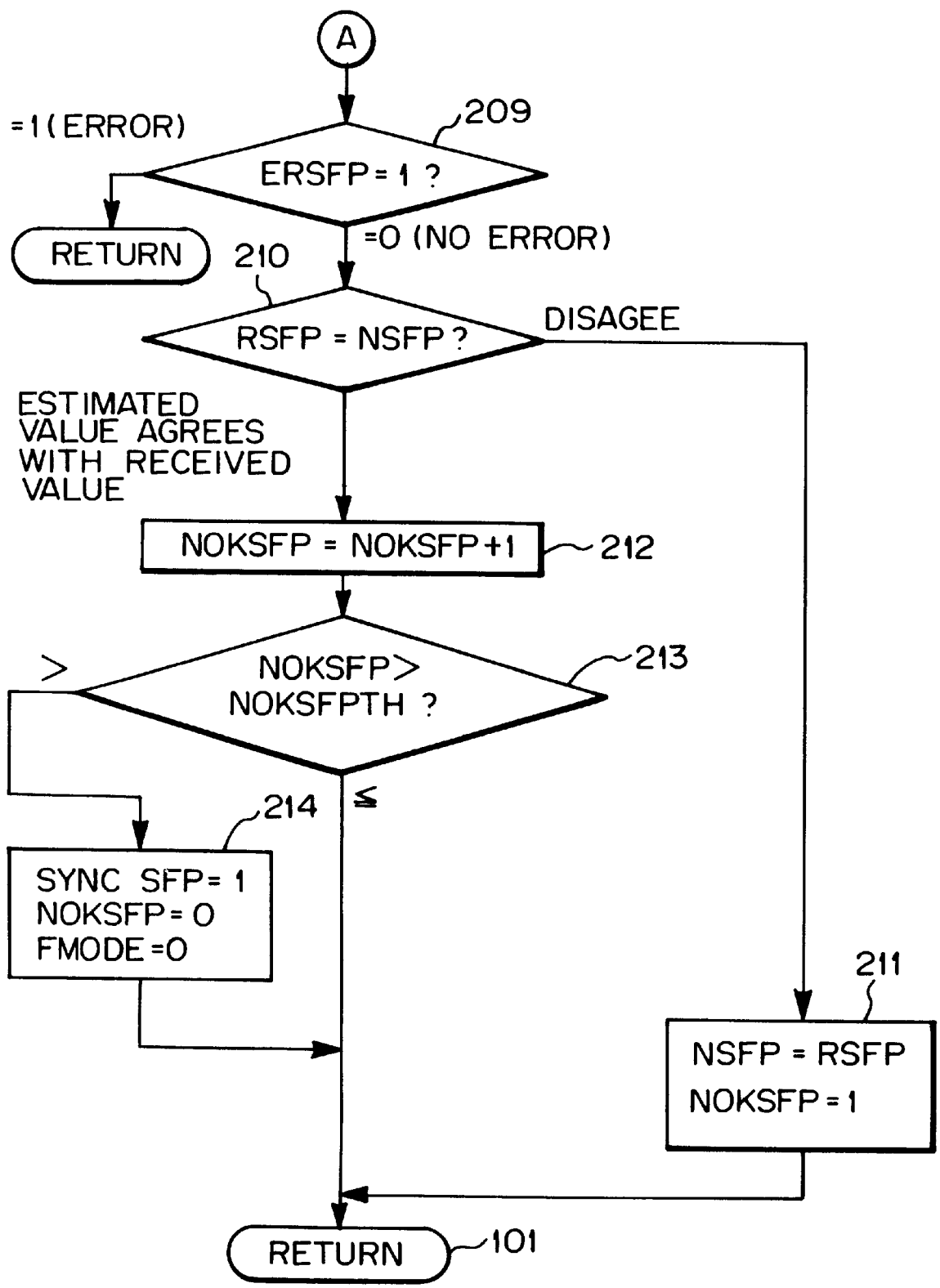
Figure 7:
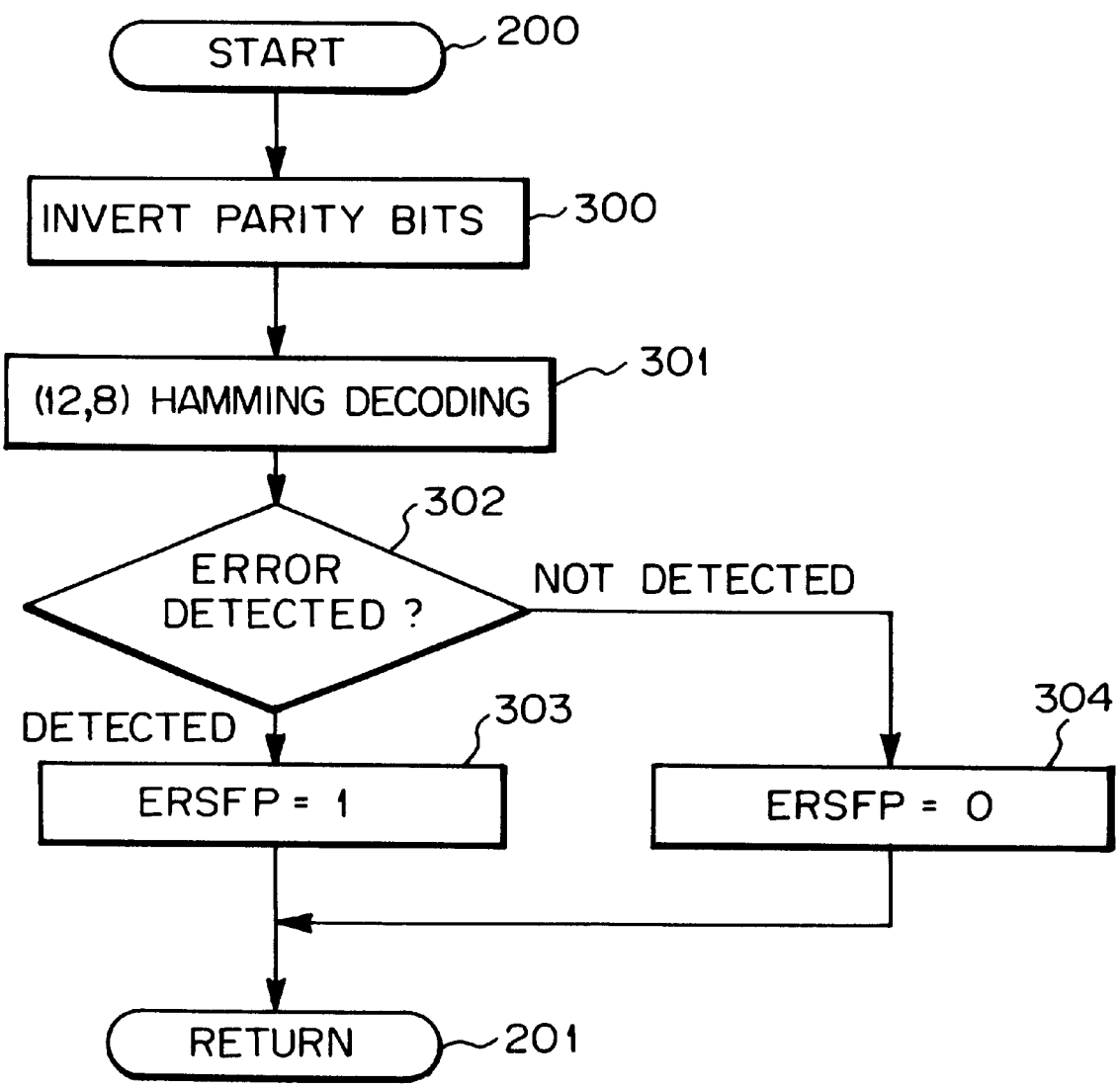
FIG. 7 is a specific flowchart, like FIGS. 6A and 6B, useful for understanding the decoding processing of the CSFP in the first embodiment.

The DSP 14 carries out the processing as shown in FIG. 1 every time it receives the slot (at 20 ms interval). When the code sequence of a new slot is obtained, the DSP 14 starts the processing, and performs the synchronizing processing of the SFP at step 100. Details of the SFP processing are shown in FIGS. 6A, 6B and 7, which will be described later.

Subsequently, the DSP 14 decides whether the synchronization of the RSFP is established or not on the basis of a synchronization flag SYNC SFP at step 101. In other words, it decides whether the location of the slot in the superframe is correctly recognized or not.

Figure 8:
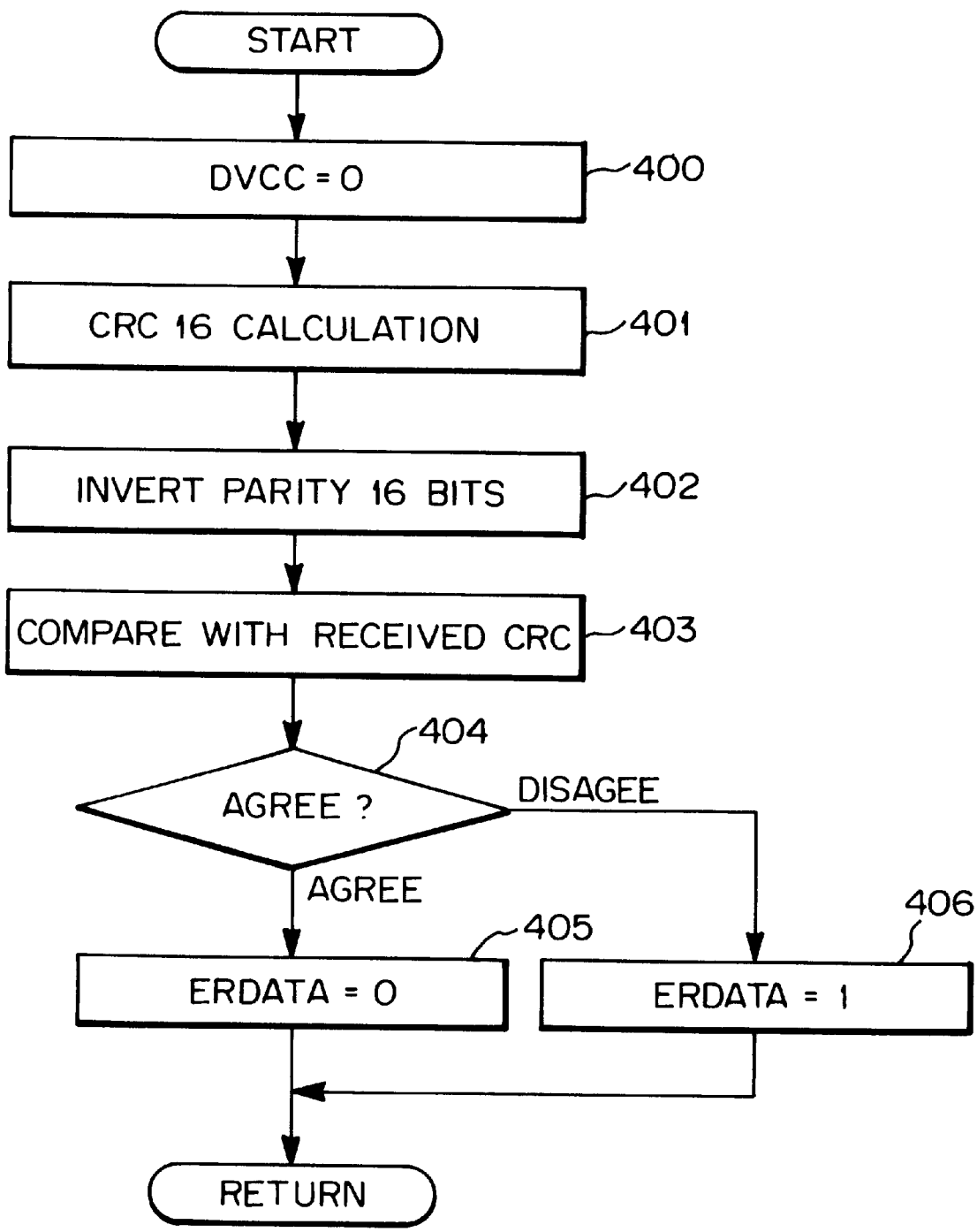
FIG. 8 is a flowchart useful for understanding CRC calculating method A in the first embodiment.

If the synchronization is established with the RSFP, the DSP 14 decides at step 102 whether or not the value of a parameter NSFP, that is, the estimated value of the SFP, is smaller than the value of the parameter NTH1 provided from CPU 15. A positive result indicates that the present slot belongs to the F-BCCH Hence, the DSP 14 carries out the CRC computation (error control processing of the received data) at step 103 in accordance with the CRC computing method A for the F-BCCH, see FIG. 4, and then returns to the main routine. Details of the CRC calculation in accordance with the CRC calculating method A are shown in FIG. 8, which will be described later.

Figure 9:
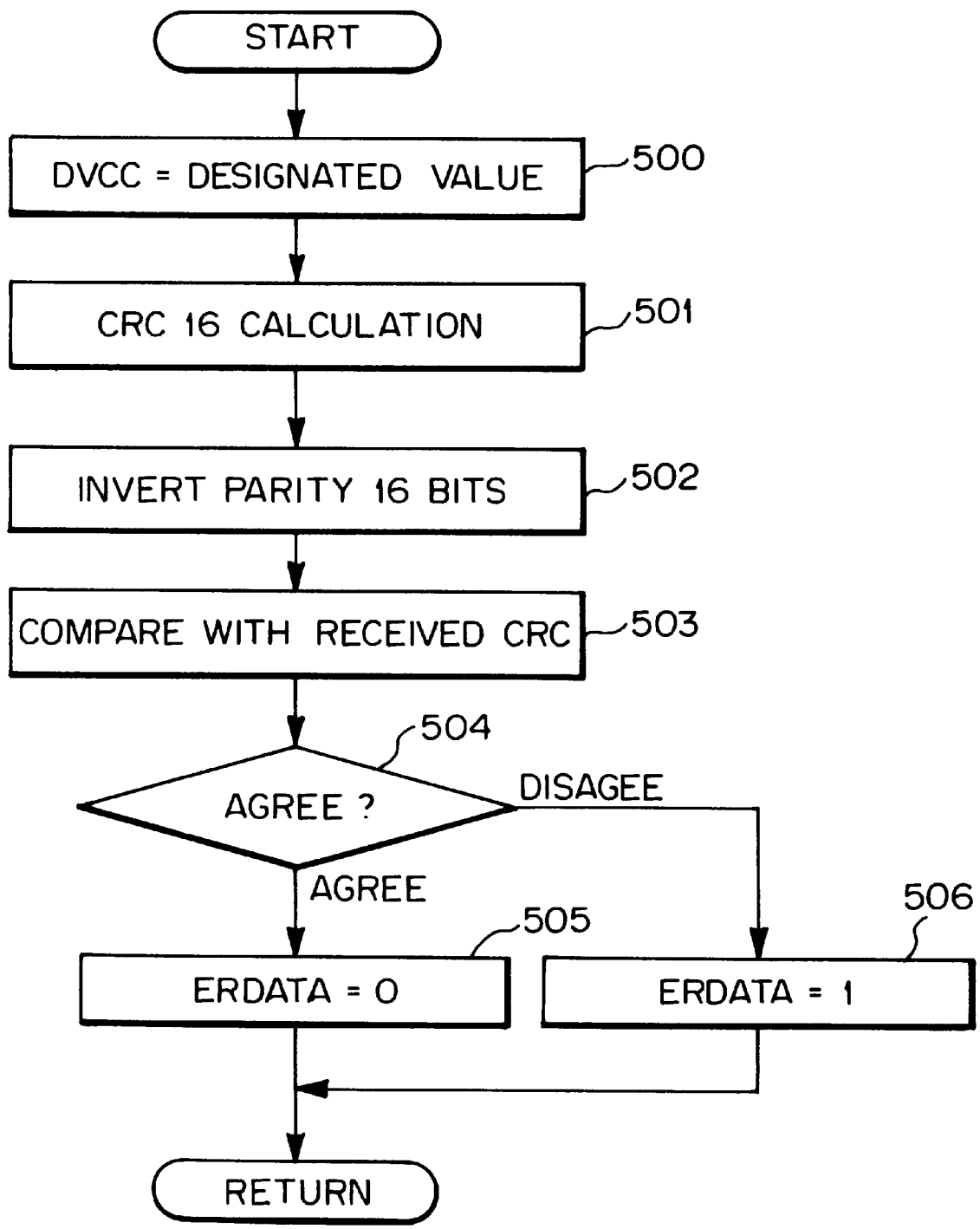
FIG. 9 is a flowchart, like FIG. 8, useful for understanding CRC calculating method B in the first embodiment.

If a negative result is obtained at the foregoing step 102, the DSP 14 decides at step 104 whether or not the value of the NSFP is smaller than the value of the NTH2 provided from the CPU 15. The positive result here indicates that the present slot belongs to one of the E-BCCH, S-BCCH and reserved slots, in which case the DSP 14 carries out at step 105 the CRC calculating processing (error control processing of the received data) in accordance with the CRC calculating method B which has been determined depending on the channel types, see FIG. 4, and returns to the main routine. Details of the CRC calculation in accordance with the CRC calculating method B are shown in FIG. 9, which will also be described later.

Figure 10:
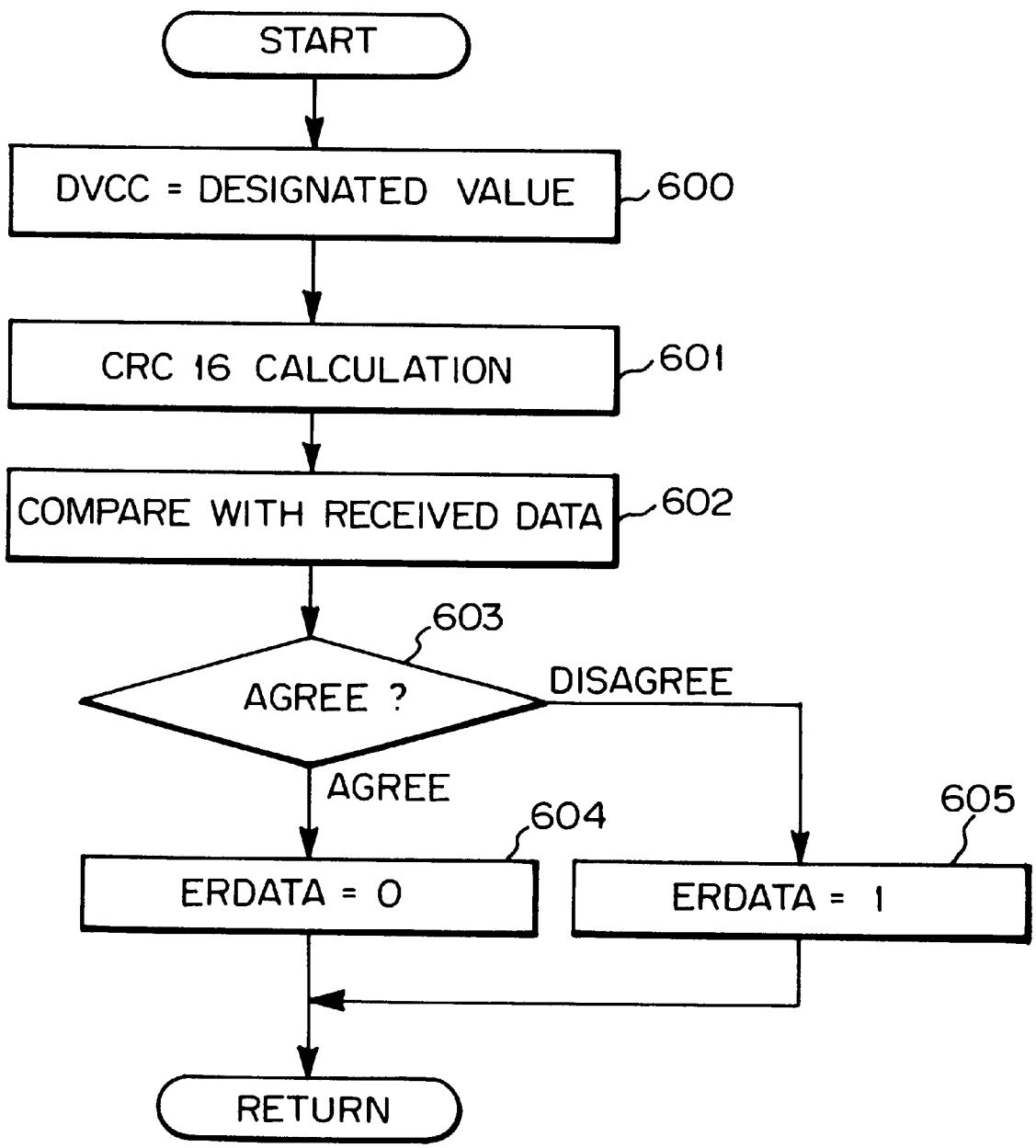
FIG. 10 is a flowchart, like FIG. 8, useful for understanding CRC calculating method C in the first embodiment.

The negative result at step 104 indicates Athat the present slot belongs to the SPACHs, in which case the DSP 14 carries out the CRC calculating processing (error control processing of the received data) in accordance with the CRC calculating method C, see FIG. 4, at step 107, and then returns to the main routine. Details of the CRC calculation in accordance with the CRC calculating method C are shown in FIG. 10, which will be described later.

If the DSP 14 decides that the synchronization of the SFP has not yet been established at step 101, it makes a decision regarding the content of the mode flag FMODE at step 106. If the result indicates that the mode is the continuous receiving mode ("0"), the DSP 14 carries out the CRC calculating processing (method A) at step 103. On the contrary, if the mode is the intermittent receiving mode ("1"), the DSP 14 carries out the CRC calculating processing (method C) at the foregoing step 107, and then returns to the main routine.

By thus changing the CRC calculating method depending on the continuous receiving mode and the intermittent receiving mode when the synchronization of the SFP has not yet been established (that is, when the SFP cannot be estimated), it is expected that the least necessary information for call-standby processing can be obtained.

In the intermittent receiving mode, i.e. in the call-standby state, it is enough for the DSP 14 to receive the slot data of the PCH. Thus, the CRC calculating method C is applied which is used for the PCH (that is, for the SPACHS). On the other hand, in the continuous receiving mode in an asynchronous state, it is preferable that the operation be restarted from acquiring the most important broadcast information, that is, from receiving the F-BCCH data correctly. Thus, the CRC calculating method A is applied which is used for the F-BCCH.

Next, the details of the SFP synchronization processing at step 100 will be described with reference to the flowcharts in FIGS. 6A, 6B and 7. The values of the parameters and flags immediately after the start (in the initial state) of the receiving operation of the mobile station unit are as follows. The initial value of the synchronization flag SYNC SFP is "0", which represents the asynchronous state. The initial value of the mode flag FMODE is "0", which represents the continuous receiving mode. The initial value of the parameter NSFP (estimated SFP) is a freely set value. The initial value of the parameter NOKSFP, which represents the number of consecutive slots in which the NSFP (estimated SFP) agrees with the RSFP (received SFP), is zero. The initial value of the parameter NERSFP, which represents the number of consecutive erroneous slots of the parameter RSFP, is zero.

The DSP 14, entering the synchronization processing of the SFP, carries out decoding of the CSFP at step 200.

FIG. 7 illustrates the details of the decoding of the CSFP. In the CSFP decoding, the DSP 14 inverts the logic levels of the parity bits corresponding to the lower four bits of the 12 bits at step 300. Subsequently, the DSP 14 carries out at step 301 (12, 8) Hamming decoding of the 12 bits whose parity bits have been inverted, thereby recovering the SFP (RSFP because they are recovered from the received signal), and decides whether an error is detected or not at step 302. If any error is detected here, the DSP 14 sets the RSFP error flag ERSFP to "1" at step 303 and returns to the main routine. If no error is detected, the DSP 14 sets the RSFP error flag ERSFP to "0" at step 304, and returns its processing to step 201 of FIG. 6.

By thus calculating the decoding of the CSFP, the DSP 14 updates the NSFP (estimated SFP) up to now to the NSFP for the current slot at step 201. Specifically, the DSP 14 adds to the NSFP up to now a fixed parameter STEPSFP whose value is one at the full rate, and two at the half rate, thereby updating the NSFP up to now to the NSFP for the present slot. The DSP 14 can decide whether the rate is the full rate or half rate by the information included in the F-BCCH. Alternatively, the DSP 14 can decide it by checking the SYC pattern at every 20 ms interval, because the same SYC pattern is repeated every 20 ms at the full rate, and every 40 ms at the half rate.

Subsequently, the DSP 14 decides the content of the current SFP synchronization flag SYNC SFP at step 202. That is, it decides whether or not the synchronization of the SFP has been established at the immediately preceding slot.

If the synchronization has been established, the DSP 14 decides whether or not the RSFP of the present slot includes an error on the basis of the content of the RSFP error flag ERSFP at step 203. If there is no error, the DSP 14 further decides whether or not the RSFP agrees with the NSFP at step 204. If the two agree with each other, the DSP 14 returns the consecutive error slot number parameter NERSFP to its initial value zero at step 205, and returns to the main routine to transfer to the processing at the foregoing step 101.

In this case, since the synchronization of the SFP has been established and the received value of the SFP agrees with its estimated value, the processing of the step 102 and thereafter is carried out. Thus, the CRC calculating method A, B or C is correctly applied in accordance with the type of the channel to which the present slot belongs.

On the other hand, if the DSP 14 decides that the RSFP includes an error at step 203, or that although there is no error the RSFP (received RSFP) does not agree with the NSFP (estimated SFP), it increments the consecutive error slot number parameter NERSFP by one at step 206, and then decides whether or not the parameter NERSFP exceeds the threshold value NERSFPTH (which is set at about 10, for example) at step 207. This is to decide whether or not the synchronization is lost.

If the consecutive error slot number parameter NERSFP is equal to or less than the threshold NERSFP, the DSP 14 returns to the main routine to transfer to the processing at step 101 of FIG. 1.

In this case, since the SFP synchronization continues, the DSP 14 carries out the processing at step 102 and thereafter in FIG. 1 using the NSFP (estimated SFP) instead of the RSFP (received SFP). Thus, the CRC calculating method A, B or C can be correctly applied in accordance with the type of the channel to which the present slot belongs. In other words, since the NSFP is used instead of the RSFP which can include an error or which is likely to be less reliable than the NSFP in view of the state up to now even if the RSFP does not includes any error, the accuracy of selecting the correct CRC calculating method will be considerably improved.

If the consecutive error slot number parameter NERSFP exceeds the threshold NERSFPTH which means that the synchronization is lost, the NSFP (estimated SFP) is no longer reliable. Accordingly, the DSP 14 returns at step 208 the SFP synchronization flag SYNC SFP, the NSFP (estimated SFP) and the consecutive error slot number parameter NERSFP to their initial values for deciding the establishment of the next synchronization, and returns to the main routine to transfer to the processing at step 101 of FIG. 1.

In this case, since the state is changed from the SFP synchronous state to the asynchronous state, the DSP 14 carries out the processing of step 106 onward of FIG. 1 to select the CRC method in accordance with the received mode.

When the DSP 14 decides at step 202 that the SFP synchronization has not yet been established at the preceding slot, it further decides at step 209 whether or not the RSFP (received SFP) of the present slot includes any error, on the basis of the content of the RSFP error flag ERSFP. When detecting any error, the DSP 14 returns to the main routine to transfer to the processing of the foregoing step 101, because there is no possibility that the synchronization is established at the present slot.

In this case also, the DSP 14 carries out the processing at step 106 and the following steps in FIG. 1 to select the CRC computing method in accordance with the receiving mode.

On the other hand, When the DSP 14 decides that the SFP synchronization has not yet. been established at the preceding slot, but the RSFP (received SFP) of the present slot does not include any error, it decides at step 210 whether the RSFP agrees with the NSFP (estimated SFP).

If the two do not agree, then the DSP 14 sets the value of the NSFP (estimated SFP) at the value of the RSFP (received SFP), updates the estimation matched consecutive slot number parameter NOKSFP to one at step 205, and returns to the main routine to transfer to the foregoing processing at step 101. Here, the estimation matched consecutive slot number parameter NOKSFP represents the number of consecutive slots whose RSFP agrees with the NSFP.

In this case also, the DSP 14 carries out the processing at step 106 and the following steps in FIG. 1 to select the CRC calculating method in accordance with the receiving mode. The foregoing step 205 is the first step for considering that the synchronous state starts again.

When the DSP 14 makes a decision that the SFP synchronization has not yet been established at the preceding slot, the RSFP (received SFP) of the present slot does not includes any error, and the RSFP (received SFP) agrees with the NSFP (estimated SFP), it increments the estimation matched consecutive slot number parameter NOKSFP by one at step 212, and compares the NOKSFP with its threshold value NOKSFPTH (which takes a value of two or three, for example) at step 213. This is to decide whether or not it is possible to decide that the synchronization has been established.

If the estimation matched consecutive slot number parameter NOKSFP is equal to or less than the threshold NOKSFPTH, the DSP 14 immediately returns to the main routine to transfer to the foregoing processing at step 101 because it is too early to consider that the synchronization of the SFP has been established.

In this case also, the DSP 14 carries out the processing at step 106 and the following steps in FIG. 1 to select the CRC computing method in accordance with the receiving mode.

When the estimation matched consecutive slot number parameter NOKSFP exceeds the threshold NOKSFPTH, the DSP 14 considers that the SFP synchronization has been established. Thus, at step 214, the DSP 14 changes the SFP synchronization flag SYNC SFP to "1" representing the synchronous state, and sets the receiving mode flag FMODE to "0" representing the continuous receiving mode, and then returns to the main routine to transfer to the foregoing processing at step 101.

In this case, since the SFP synchronization has been established, the DSP 14 executes the processing at step 102 and the following steps of FIG. 1, thereby carrying out the CRC calculation of the present slot in accordance with the NSFP (which is equal to RSFP in this case).

Next, details of the CRC calculating processing (the processing at step 103 of FIG. 1) in accordance with the CRC calculating method A will be described with reference to FIG. 8.

Upon entering the CRC calculating processing in accordance with the CRC calculating method A, the DSP 14 sets the value of the parameter DVCC at 00h at step 400 because the present slot belongs to the F-BCCH, and carries out by using the parameter DVCC the 16-bit parity bit computation (CRC 16 computation) of the information in the received data DATA at step 401. Subsequently, since the present slot belongs to the F-BCCH, the DSP 14 inverts the logic levels of the obtained 16-bit parity bits at step 402, compares the 16-bit parity bits whose logic levels are inverted with the parity bits (received CRC) in the received data (DATA) at step 403, and decides whether they agree with each other at step 404. If they agree, the DSP 14 sets the error flag ERDATA of the received data to "0" representative of no error at step 405, and returns to the main routine. On the other hand, if they disagree, then the DSP 14 sets the error flag ERDATA to "1" representative of an error at step 406, and returns to the main routine. Thus, the CRC calculation is carried out in accordance with the CRC calculating method A assigned to the F-BCCH.

Next, details of the CRC calculating processing (the processing at step 105 of FIG. 1) in accordance with the CRC calculating method B will be described with reference to FIG. 9.

Upon entering the CRC calculating processing in accordance with the CRC calculating method B, the DSP 14 sets the value of the parameter DVCC at the value designated by the base station and provided from the CPU 15 at step 500 because the present slot belongs to the E-BCCH, S-BCCH or reserved slot, and then carries out by using the parameter DVCC the 16-bit parity bit calculation (CRC 16 calculation) of the information bits in the received data DATA at step 501. Subsequently, since the current slot belongs to the E-BCCH, S-BCCH or reserved slot, the DSP 14 inverts the logic levels of the obtained 16-bit parity bits at step 502, compares the 16-bit parity bits whose logic levels are inverted with the parity bits (received CRC) in the received data (DATA) at step 503, and decides whether they agree with each other at step 504. If they agree, the DSP 14 sets the error flag ERDATA of the received data to "0" representative of no error at step 505, and returns to the main routine. By contrast, if they disagree, the DSP 14 sets the error flag ERDATA to "1" representative of an error at step 506, and returns to the main routine. Thus, the CRC calculation is carried out in accordance with the CRC calculating method B assigned to the E-BCCH, S-BCCH and reserved slots.

Next, details of the CRC calculating processing (the processing at step 107 of FIG. 1) in accordance with the CRC computing method C will be described with reference to FIG. 10. Upon entering the CRC calculating processing in accordance with the CRC calculating method C, the DSP 14 sets the value of the parameter DVCC at the value designated by the base station and provided from the CPU 15 at step 600 because the present slot belongs to the SPACHs, and then carries out by using the parameter DVCC the 16-bit parity bit calculation (CRC 16 calculation) of the information bits in the received data DATA at step 601. Subsequently, the DSP 14 compares the 16-bit parity bits with the parity bits (received CRC) in the received data (DATA) at step 602, and decides whether they agree with each other at step 603. If they agree, then the DSP 14 sets the error flag ERDATA of the received data to "0" representative of no error at step 604, and returns to the main routine. On the other hand, if they disagree, the DSP 14 sets the error flag ERDATA to "1" representative of an error at step 605, and returns to the main routine. The CRC calculation is thus carried out in accordance with the CRC calculating method C assigned to the SPACHS.

According to the embodiment described above, the DSP 14 updates the NSFP, the estimated value of the SFP, at every slot interval, and determines the CRC calculating method of the received data at the present slot on the basis of the NSFP. This enables the error decision on the received data to be performed correctly, even if the received error occurs with the RSFP, which is the received value of the SFP obtained by decoding the CSFP.

Furthermore, according to the embodiment, since the CRC calculating method is determined depending on whether the receiving mode is continuous or intermittent when the SFP is not correctly estimated (that is, in the asynchronous state of the SFP), the minimum data required for the call processing at that stage can be obtained even in the asynchronous state of the SFP. Specifically, since the asynchronous state in the continuous receiving mode is a step in the sequence immediately after the start of the reception, at which the known information of the F-BCCH is required, the validity of the known information in the F-BCCH can be confirmed even in the asynchronous state by selecting the CRC calculating method A corresponding to the F-BCCH. In addition, since the asynchronous state in the intermittent receiving mode is a step in the sequence at which the receiving processing of only the PCH is performed, the validity of the received data in the PCH can be confirmed even in the asynchronous state by selecting the CRC calculating method C corresponding to the SPACHs (including PCH).

The 8-bit estimated value NSFP of the SFP in the embodiment can also be used as a training sequence in the synchronous state. This will enable the accuracy of the bit synchronization or the like to be improved.

EMBODIMENT 2

Figure 11:
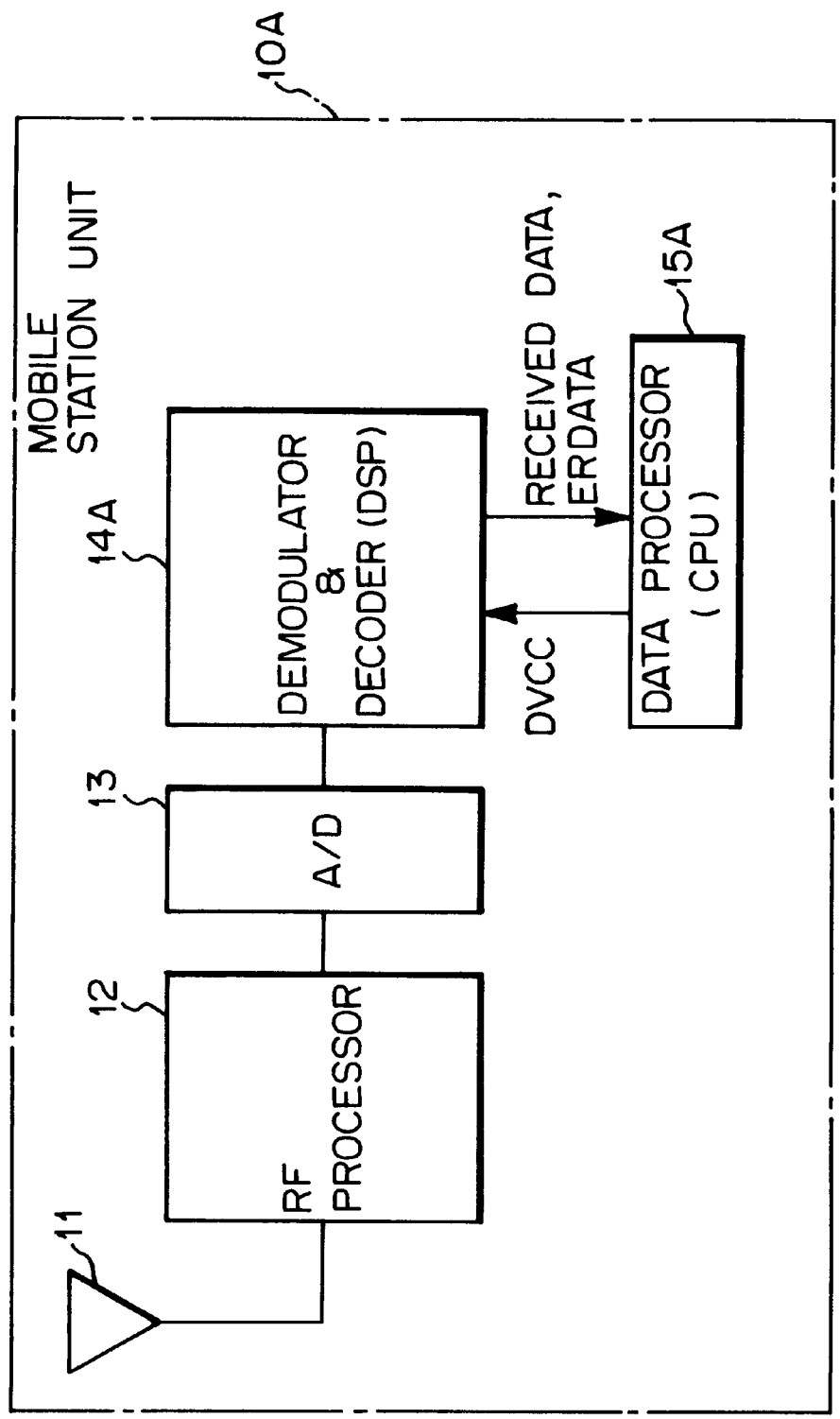
FIG. 11 is a schematic block diagram, like FIG. 5, showing a second or alternative embodiment of the decoder in accordance with the present invention.

FIG. 11 is a schematic block diagram showing the configuration of an alternative or second embodiment of the mobile station unit in accordance with the present invention, in which the elements like those of FIG. 5 are designated by the same reference numerals. In FIG. 11, the mobile station unit 10A of the alternative embodiment comprises the antenna 11, the RF (Radio Frequency) processor 12, the A/D converter 13, a demodulator and decoder 14A (called DSP 14A hereinafter because it is usually consists of a DSP), and a data processor 15A (referred to as CPU 15A hereinafter because it is also usually consists of a CPU).

The functions of the antenna 11, the RF processor 12 and the A/D converter 13 are the same as those of the first embodiment, and hence the description thereof is omitted here. The DSP 14A of the second embodiment also basically carries out the digital demodulation of the input digital signal and converts it to a code sequence, thereby decoding the code sequence. It may be the same as the DSP 14 of the first embodiment except for the error checking of the received data in the decoding processing. The DSP 14A of the second embodiment provides the CPU 15A with received data (corresponding to the "information" mentioned hereinbefore) and the flag ERDATA representing whether the received data includes an error ("1") or not ("0"). The CPU 15A of the second embodiment also processes the received data fed from the DSP 14A. In the second embodiment, the CPU 15A provides the DSP 14A with only the parameter DVCC obtained by analyzing the received data in the F-BCCH.

Figure 12A:
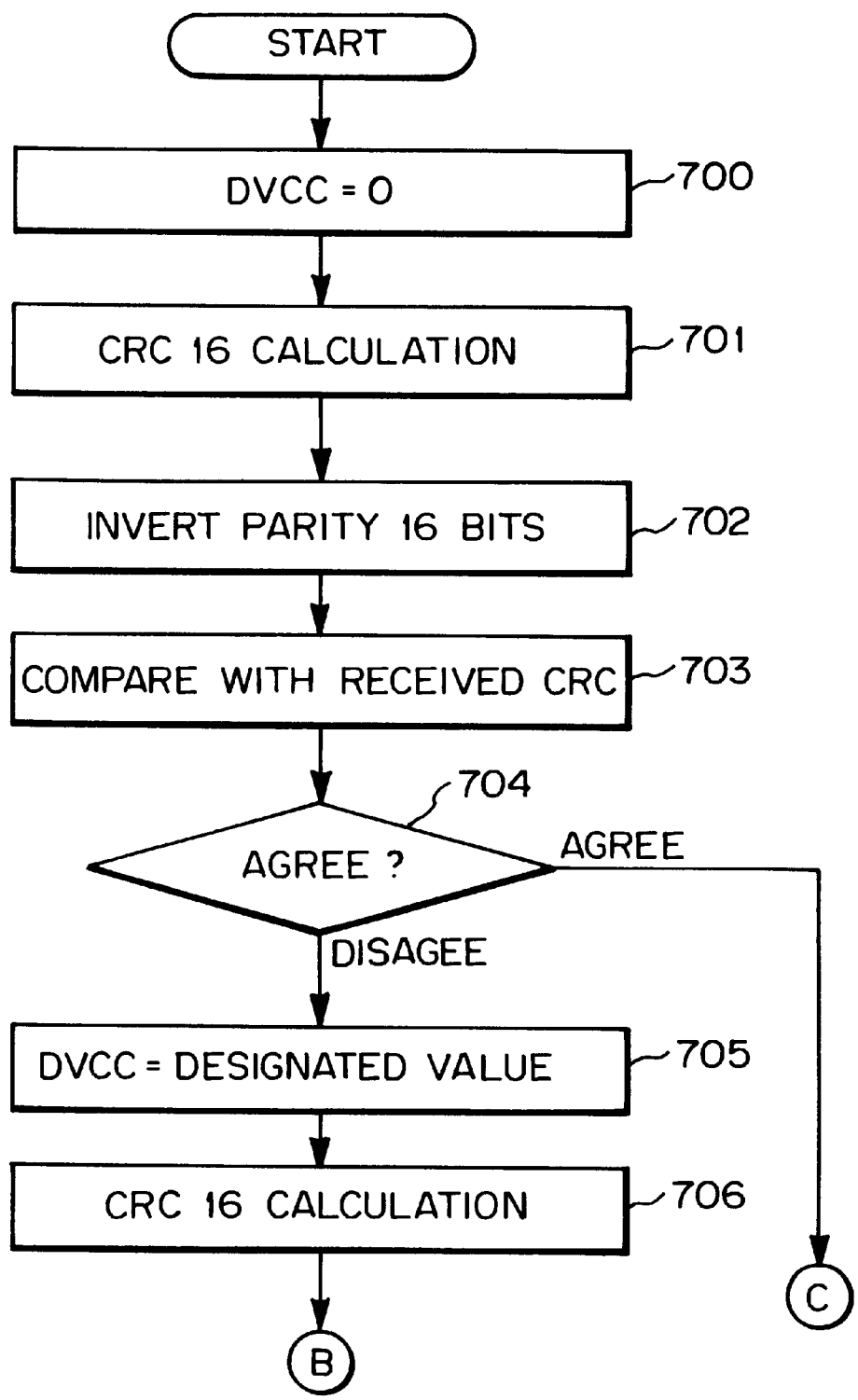
FIGS. 12A and 12B are a flowchart showing the overall processing in the second embodiment.
Figure 12B:
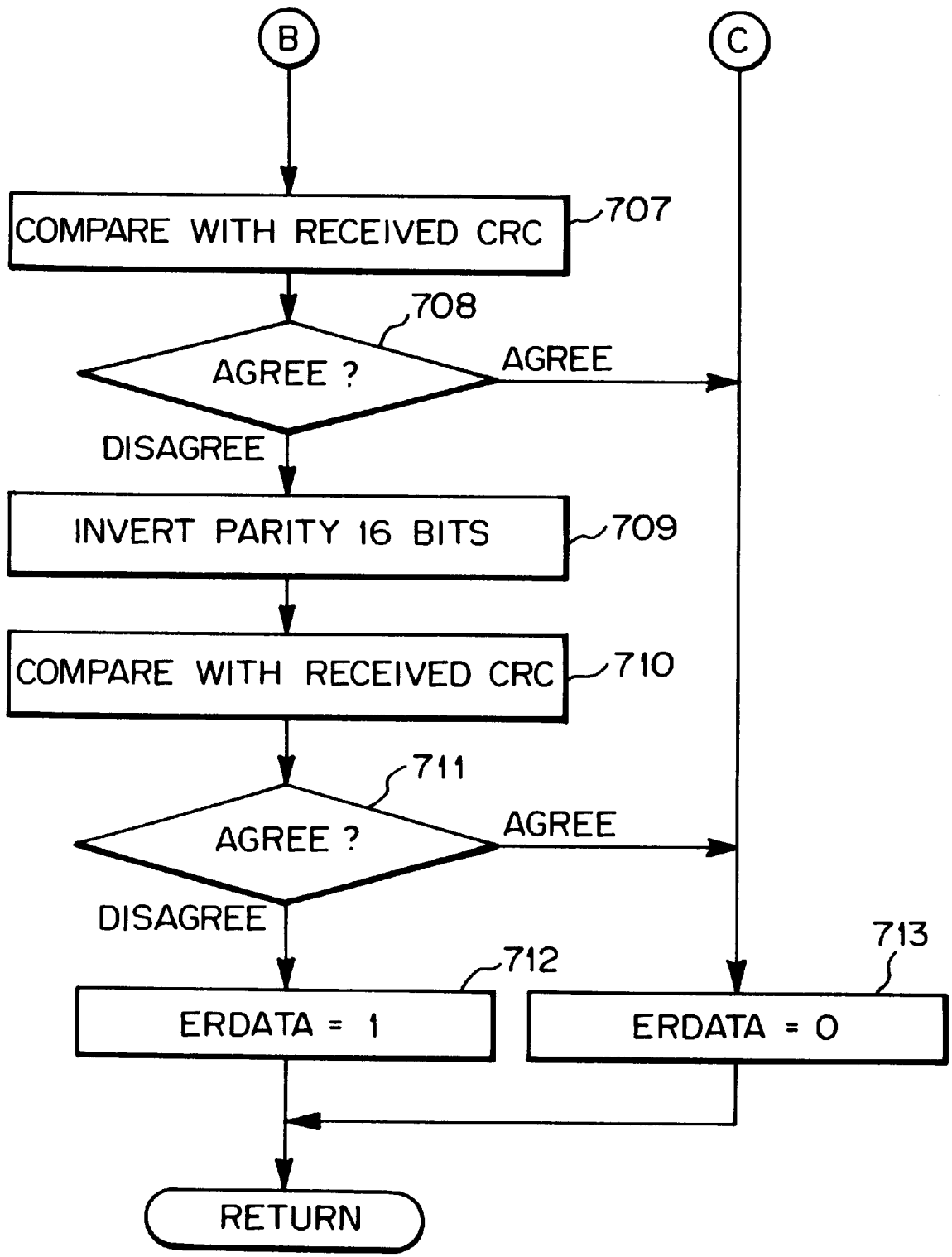

Next, the processing specific to the second embodiment will be described with reference to the flowchart of FIGS. 12A and 12B. First, the DSP 14A sets the value of the parameter DVCC at 00h at step 700, and carries out by using the parameter DVCC the 16-bit parity bit computation (CRC 16 computation) of the information bits in the received data DATA at step 701. Subsequently, the DSP 14A inverts the logic levels of the obtained 16-bit parity bits at step 702, compares the 16-bit parity bits with the parity bits (received CRC) in the received data (DATA) at step 703, and decides whether they agree with each other at step 704. If they agree, the DSP 14A sets the error flag ERDATA of the received data to "0", representative of no error at step 713.

The foregoing steps 701–704 are carried out expecting that the slot possibly belongs to the F-BCCH. If the present slot really belongs to the F-BCCH, and the received data is free from error, then the decision at step 704 results in agreement, so that the processing transfers to step 713, at which the error flag ERDATA of the received data is set to "0", representative of no error, thus ending this processing routine.

If the decision at step 704 results in disagreement of the parity bits whose logic levels are inverted at step 702 with the received parity bits, the DSP 14A sets the value of the parameter DVCC at the value designated by the base station and provided from the CPU 15A at step 705, and then carries out by using the parameter DVCC the 16-bit parity bit computation (CRC 16 computation) of the information bits in the received data (DATA) at step 706. Subsequently, the DSP 14A compares the 16-bit parity bits obtained by the calculation with the parity bits (received CRC) in the received data (DATA) at step 707, and decides whether they agree with each other at step 708.

The processing at steps 705–708 are carried out expecting that the present slot possibly belongs to the SPACHs. When the present slot really belongs to the SPACHs, and the received data is free from error, the decision at step 708 results in agreement, so that the processing transfers to step 713, at which the error flag ERDATA of the received data is set to "0", representative of no error, thus ending this processing routine.

If it is decided at step 708 that the parity bits obtained by the calculation at step 706 disagree with the received parity bits, the DSP 14A inverts at step 709 the logic levels of the parity bits obtained by the calculation, compares the parity bits whose logic levels are inverted with the received parity bits at step 710, and decides whether they agree with each other at step 711.

Thus, the DSP 14A sets the parameter DVCC at the value designated by the base station and fed from the CPU 15A at step 705, and carries out by using the parameter DVCC the 16-bit parity bit calculation (CRC 16 calculation) of the information bits of the received data (DATA) at step 706. Taking account of this, the processing of steps 709–711 is carried out expecting that the present slot possibly belongs to the E-BCCH, S-BCCH or reserved slot, in which case the decision at step 711 results in the agreement of the parity bits obtained by the calculation with the received parity bits, as long as the received data is free from error. Thus, the DSP 14A transfers the processing to step 713 to set the error flag ERDATA of the received data to "0", representative of no error, and closes this processing routine.

When it is decided that the calculated parity bits disagree with the received parity bits at step 711, this means that they disagree through all the error checkings of the received data at steps 700–704, 705–708 and 709–711, in accordance with the CRC calculating methods A, C and B, respectively. In this case, the DSP 14A transfers the processing to step 712 at which it sets the error flag ERDATA of the received data to "1", representative of error, and terminates the processing routine.

According to the second embodiment, even if the CRC calculating method varies depending on the location of the slot in the frame, the correct result can be obtained without recognizing the location of the slot in the frame.

In addition, since the same processing is performed in both the continuous receiving mode and the intermittent receiving mode, the internal structure of the demodulator and decoder 14A can be simplified.

Although the present invention is applied to the receiver of the digital control channel according to the North American Standard TDMA cellular system in the two illustrative embodiments disclosed, the present invention can be applied to other digital communications systems including equipment for handling data other than voice data.

More specifically, the present invention can be widely applied to receivers which are provided with transmitted frames consisting of multiple slots including position information in the frame, and which use different error control methods in accordance with the position of the slot in the frame. Accordingly, the error control method is not limited to those of the foregoing embodiments, and the number of error control methods per frame (superframe) is not limited to the specific values described in connection with the illustrative embodiments.

Furthermore, although the demodulator and decoders 14 and 14A are implemented by means of the program sequences in the DSP, and the data processors 15 and 15A are structured by the CPU in the embodiments, they can be implemented by means of hardware, such as gate arrays, or accelerator attached to the DSP.

While the present invention has been described with reference to the particular illustrative embodiments, it is not to be restricted by those embodiments. It is to be appreciated that those skilled in the art can change or modify the embodiments without departing from the scope and spirit of the present invention.

What we claim is:

1. A decoder for receiving a frame of coded data consisting of multiple slots which include intra-frame positions information indicating position of the slots in the frame and decoding the coded data, wherein appropriate ones of plural error control methods are adaptively applied, depending on the positions of the slots in the frame, said decoder comprising:

intra-frame position estimation means for generating an estimated value of the intra-frame position information of a current slot in accordance with an estimated value of the intra-frame position information of an immediately preceding slot, and a fixed amount of variation per slot of the intra-frame position information;

intra-frame position information synchronization means for establishing synchronization between a received value and the estimated value of the intra-frame position information; and applied method determination means for determining an error control method to be applied to the current slot in a synchronous state of the received value and the estimated value, in response to the estimated value of the intra-frame position information of the current slot generated by said intra-frame position estimation means.

2. The decoder in accordance with claim 1, wherein said intra-frame position information synchronization means makes a decision in an asynchronous state that the asynchronous state transfers to a synchronous state when the received value of the intra-frame position information is free from error, and the received value agrees with the estimated value of the intra-frame position information over a predetermined number of consecutive slots.

3. The decoder in accordance with claim 1, wherein said intra-frame position information synchronization means makes a decision in a synchronous state that the synchronous state is lost when the received value of the intra-frame position information includes an error, or the received value disagrees with the estimated value of the intra-frame position information over a predetermined number of consecutive slots.

4. The decoder in accordance with claim 1, wherein the decoder receives a frame of coded data in a continuous receiving mode, and in addition has an intermittent receiving mode in which only part of the slots in the frame is received;

said applied method determination means determining said error control means to be applied to the current slot depending on whether the decoder is in the continuous receiving mode or the intermittent receiving mode, when said intra-frame position information synchronization means decides that a present state is the asynchronous state.

5. The decoder in accordance with claim 1, wherein the estimated value of the intra-frame position information is utilized as one of the values of a training sequence.

6. A decoder for receiving a frame of coded data consisting of multiple slots and decoding the coded data, wherein appropriate ones of a plurality of error control methods are adaptively applied depending on the positions of the slots in the frame, said decoder comprising:

a plurality of error control means, each corresponding to one of the error control methods, for performing an error control operation on received data in a current slot by applying each of the error control methods to the current slot regardless of the positions of the slots in the frame; and application method selection means for selecting a control result obtained by one of said plurality of error control means as a control result obtained by a control method assigned to the current slot, considering control results obtained by said plurality of error control means.

* * * * *